(12) United States Patent
Petcavich

(10) Patent No.: US 7,935,375 B2
(45) Date of Patent: May 3, 2011

(54) PROCESS AND COATING COMPOSITION FOR EXTENDING THE SHELF LIFE OF POST HARVEST PRODUCE

(75) Inventor: Robert J. Petcavich, San Diego, CA (US)

(73) Assignee: BASF Corporation, Mount Olive, NJ (US)

( * ) Notice: Subject to any disclaimer, the term of this patent is extended or adjusted under 35 U.S.C. 154(b) by 661 days.

(21) Appl. No.: 10/633,207

(22) Filed: Aug. 1, 2003

(65) Prior Publication Data

US 2004/0022906 A1    Feb. 5, 2004

Related U.S. Application Data

(60) Provisional application No. 60/400,823, filed on Aug. 2, 2002.

(51) Int. Cl.
    *A23B 7/153* (2006.01)
(52) U.S. Cl. ......................... 426/310; 426/302
(58) Field of Classification Search .................. 426/302, 426/654, 308, 310, 321, 628
    See application file for complete search history.

(56) References Cited

U.S. PATENT DOCUMENTS

| | | | | |
|---|---|---|---|---|
| 2,872,325 A | * | 2/1959 | Scott et al. | 426/300 |
| 3,669,691 A | * | 6/1972 | De Long et al. | 426/102 |
| 3,674,510 A | * | 7/1972 | Bice et al. | 514/365 |
| 4,006,259 A | | 2/1977 | Kalmar | |
| 4,207,347 A | | 6/1980 | D'Atri et al. | |
| 4,532,156 A | | 7/1985 | Everst-Todd | |
| 4,710,388 A | * | 12/1987 | Liu | 426/102 |
| 4,729,190 A | * | 3/1988 | Lee | 47/57.6 |
| 4,751,091 A | | 6/1988 | Nip et al. | |
| 4,769,262 A | | 9/1988 | Ferrar et al. | |
| 5,030,510 A | | 7/1991 | Yokoyama et al. | |
| 5,093,080 A | | 3/1992 | Keller | |
| 5,128,159 A | | 7/1992 | Sayles | |
| 5,148,738 A | | 9/1992 | Orman et al. | |
| 5,160,768 A | | 11/1992 | Antoon, Jr. | |
| 5,198,254 A | | 3/1993 | Nisperos-Carriedo et al. | |
| 5,273,777 A | | 12/1993 | Crotzer et al. | |
| 5,364,648 A | | 11/1994 | Meldrum | |
| 5,376,391 A | | 12/1994 | Nisperos-Carriedo et al. | |
| 5,427,807 A | | 6/1995 | Chum et al. | |
| 5,489,442 A | | 2/1996 | Dunn et al. | |
| 5,547,693 A | | 8/1996 | Krochta et al. | |
| 5,575,418 A | | 11/1996 | Wu et al. | |
| 5,804,633 A | | 9/1998 | Loftin et al. | |
| 6,165,529 A | * | 12/2000 | Yang et al. | 426/310 |
| 6,203,833 B1 | | 3/2001 | Yang et al. | |

FOREIGN PATENT DOCUMENTS

EP          0755990 A2 *  1/1997

* cited by examiner

Primary Examiner — Keith D Hendricks
Assistant Examiner — Jyoti Chawla
(74) Attorney, Agent, or Firm — Brinks Hofer Gilson & Lione

(57) ABSTRACT

The shelf life of fresh harvest produce is extended by coating the exterior surface of freshly harvested produce with a coating composition comprising an aqueous emulsion of polyvinylidene chloride copolymers containing from about 0.25 to 25% by weight of copolymer solids to water and between 0.001 and 20% plasticizer preferably a polyethylene oxide based additive such as Triton-X to weight of copolymer solids in the emulsion. The coating may also contain biocides as well to control bacteria and fungal growth on the post harvest produce during storage, shipping, distribution, and sale of the product. The coating composition is effective in extending the shelf life of produce.

6 Claims, No Drawings

US 7,935,375 B2

PROCESS AND COATING COMPOSITION FOR EXTENDING THE SHELF LIFE OF POST HARVEST PRODUCE

REFERENCE TO RELATED APPLICATION

This application claims priority of prior U.S. provisional application Ser. No. 60/400,823, filed Aug. 2, 2002.

FIELD OF THE INVENTION

The present invention is directed to a process for preserving post harvest produce by coating the same with a coating composition capable of controlling the transmission of gasses and water vapor into and out of the produce during maturation and/or ripening of the produce.

BACKGROUND OF THE INVENTION

Current techniques for the preservation of fresh post-harvest produce include temperature and/or pressure treatment, controlled atmosphere packaging, wax and similar coating techniques, synthetic polymer coating techniques, polymer packaging and genetic engineering of various metabolic pathways that cause ripening.

Various coating compositions have been proposed, e.g., a petroleum solvent solution of a waxy film former and a fungicide (U.S. Pat. No. 4,006,259); a mixture of lard, tallow, and lecithin applied in molten state (U.S. Pat. No. 4,207,347); hydrogenated jojoba oil (U.S. Pat. No. 4,356,197); a salt of carboxylic acid and an alkyl amine (U.S. Pat. No. 4,532,156); a 3% oil-in-water emulsion of hydrogenated vegetable oil, stearic acid, and anionic emulsifier, (U.S. Pat. No. 4,649,057); the combination of a food acid, and edible reducing agent and a carbohydrate thickener followed by freezing (U.S. Pat. No. 4,751,091); a denatured proteinaceous solution of soybeans, wheat and corn (U.S. Pat. No. 5,128,159); simultaneously scrubbing and drenching with a liquid containing fungicide (U.S. Pat. No. 5,148,738); a slurry consisting of by products of the produce and certain sugars and acids (U.S. Pat. No. 5,364,648); a mixture of a polysaccharide polymer, a preservative, an acidulent and emulsifiers (U.S. Pat. Nos. 5,198,254 and 5,376,391); and, a light activated composition (U.S. Pat. No. 5,489,442).

Various forms of produce packaging are disclosed, by the way of example, in U.S. Pat. Nos. 4,769,262; 5,030,510; 5,093,080; 5,160,768; 5,427,807; 5,547,693; and 5,575,418.

Some Russian and Japanese publications have proposed the use of polyvinyl alcohol as a gas barrier coating for produce, but few if any of these suggestions have found their way into the commercial market.

U.S. Pat. Nos. 6,165,529 and 6,203,833 commonly owned by the assignee of this application, disclose highly improved processes for preserving fresh produce and coating compositions therefore comprised of substantially hydrolyzed cold water soluble polyvinyl alcohol, low molecular weight cold water soluble starch, and surfactant. Optional additional ingredients are plasticizer, antimicrobials, and antifoaming agents, preferably the starch is maltodextrin, the surfactant lecithin or dioctyl sodium sulfosuccinate, the antimicrobrials methylparaben, and the plasticizer glycerin.

OBJECTS AND SUMMARY OF THE INVENTION

An object of this invention is to provide a new, improved and highly economical coating process for extending the shelf life of post-harvest produce and a composition therefore.

Another object of this invention is to provide a process for preserving post-harvest produce that prolongs the period during which the produce may be stored at ambient temperatures without significant deterioration of the produce.

A further object is to provide a process for preserving fresh produce that delays maturation, water loss, and ripening of post-harvest produce and therefore prolongs the duration of time between harvesting and the time in which the produce is in prime condition for consumption.

In accordance with the invention, the new and improved process resides in the application to the exterior surface of post-harvest produce of an improved coating composition comprising an aqueous emulsion from about 0.25 to about 25 percent by weight polyvinylidene chloride copolymer, and from about 0.0001 to 10 percent surfactant, preferably Triton™ X octylphenol ethoxylate surfactants commercially available from The Dow Chemical Company. Optional additional ingredients include antimicrobials, plasticizers, and antifoaming agents.

The coating composition limits but does not prevent respiratory exchange, i.e., transmission of oxygen (air) into the produce, transmission of gasses, e.g. ethylene and carbon dioxide, out of the produce, and water vapor transmission to control and prolong the maturation and ripening process and, to increase the permissible storage time between harvest and consumption.

These and other objects and advantages of the invention will become apparent to those of reasonable skill in the art form the following detailed description.

DETAILED DESCRIPTION

The following is a detailed description of certain embodiments of the invention, which are presently deemed by the inventor to be the best mode of carrying out the invention. Drawings are not deemed necessary inasmuch as the following description will enable any person skilled in the art to make use of the invention.

As above indicated, the invention resides in the discovery that the application of a specially formulated coating composition to the exterior surface of post harvest produce in particular fruits, especially those having a peel, rind, or skin, that are not edible, significantly delays maturation, ripening, and water loss. This in turn prolongs the duration of time between harvest and optimum conditions for consumption so that more widespread distribution of fresh fruits and vegetables is accommodated. Additionally, the need for specialized transportation and storage equipment and conditions, such as refrigeration, can in many cases be eliminated or at least alleviated.

Pursuant to the invention, the coating composition is preferably and most easily and economically applied to the exterior surfaces of selected fruits and vegetables by application of a dilute liquid emulsion.

The emulsion is preferably aqueous and comprised by weight percent (w/w) from about 0.25% to about 25%, preferably 1% to 10% and more preferably 2% to 7% of polyvinylidene chloride copolymer suspended in water, and about 0.0001 to 10%, and more preferably from about 0.01% to 1% surfactant, e.g., Triton™ X-45 octylphenol ethoxylate surfactant commercially available from The Dow Chemical Company.

Optionally, the coating composition may also include any or all of from about 0.05% to about 1% antimicrobrials, preferably methylparaben; a small amount of plasticizer, e.g., polysorbate from about 0.01% to 10% by weight of polyvinylidene chloride copolymer; and, preferably about 0.005% of an antifoaming agent, such as polydimethylsiloxane.

The concentration of the constituents in water may range from about 0.25% to 7% by weight, i.e., the dilute solution is comprised of from about 93% to about 99% by weight water.

The aqueous solution may be applied to the produce in any suitable or customary manner, e.g., by dipping the produce in the tank or vat of the solution, by spraying the solution onto the produce, or by passing the produce through a downwardly falling curtain or waterfall of the solution. The entire exterior surface of the produce, or when warranted only portions of the exterior surface of the produce, can be coated with the solution to achieve desired shelf-life extension. When spraying coats the produce, the solids content of the composition preferably should not exceed 20%, and more preferably 5%.

Following application of the coating from the emulsion, the post harvest produce may be packed wet for subsequent shipping, or if desired, the coating may be dried either in ambient air or a forced air drying tunnel.

The coating formed on the produce from the emulsion has a degree of permeability, thereby enabling the dried coating to readily exchange respiratory products with the surrounding atmosphere. The extent to which breathing or respiration is accommodated is a function of the physiological reactions of the species of the produce and the particular chemical composition of the emulsion coating. While not intending to be bound by any particular theory, the coating enables limited transmission of oxygen, ethylene, and carbon dioxide gases produced during the maturation process, or artificially exposed to the post harvest produce in specifically designed gassing chambers. In particular the coating of the present invention significantly reduces water vapor transmission and therefore water loss of the produce thereby reducing and or delaying dehydration, which manifests itself in the produce as shriveling, and reduction of size of the produce or wrinkling of the skin on the produce.

In the present invention it was found that a the polyvinylidene emulsions used had the best results if the emulsions resulted in dried films having gas transmissions in the following ranges, for oxygen the range was 1 to 100 cm3-um/(m2-day-bar) at 25° C. and 85% relative humidity with the most preferred range being 10-80 cm3-um/(m2-day-bar) at 25° V and 85% relative humidity, for water vapor the range was 1-50 g-um/(m2-day) at 38° C. and 90% relative humidity, with 10-30 g-um/(m2-day) at 38° C. and 90% relative humidity being preferred.

The polyvinylidene chloride copolymers used in the present invention can be any of the following, polyvinylidene chloride-co-, acrylic acid, methyl acrylic acid, vinyl chloride, vinyl acetate, methyl methacrylate, propylene, ethylene, acrylates, styrene's, or any combination of the above mention monomers which form the copolymer composition.

To achieve the objects and advantages of the invention and to provide an emulsion that forms a thin continuous film on the surface of the post harvest produce that extends the shelf life of the produce, the following coating composition, based on weight percent to water is presently preferred:

| | |
|---|---|
| DIOFAN A036 | 5% |
| Triton-X45 | 0.0005% |
| Water | 94.0095% |

The DIOFAN A036 is the primary constituent of the coating for controlling the gas exchange of the post harvest produce. The Triton-X45 reduces the surface tension of the composition and facilitates the formation of a very uniform coating on the surface of the produce, which is preferable for consistent performance.

A number of polyvinylidene chloride copolymers can be used in the present invention such as DIOFAN A036, A736, Al 15, A716, 193D, A232, A050, A063 and A603, all available commercially available (such as from the Solvay Corporation, Solvin S. A., Specialty Polymers, Brussels Belgium).

The surfactant or wetting agent used enhances the ability of the composition to uniformly coat and adhere the coating to waxy surfaces generally found in post harvest produce. Triton™ X-45 octylphenol ethoxylate is more preferred but one can also use other octylphenol ethoxylates such as Triton™ X, 15, 35, 45, 100, 102, 114, 165, 305, 405, 505, L-80N, as well as Tergitol™ nonylphenol ethoxylate surfactants both of which are available from The Dow Chemical Company, Midland, Mich., Polysorbate known by the trade name Tween®-XXX where X designates a digit from 0 to 9 can also be used and are available from ICI Americas Inc. of Wilmington, Del. Dioctyl sodium sulfosuccinate from the Cytec Corporation can also be used.

Optionally, the coating composition may also include one or more of the following: from about 0.05% to 0.1% by weight of an antimicrobial, such as triclosan and more preferably methylparaben, a fungicide from about 50 to 5000 parts per billion such as TBZ, SOPP, or Imalzalil, and a plasticizer such as glycerin or polysorbate from about 0.1% to 20% to the weight of polyvinylidene chloride copolymer in the water based emulsion.

An antifoaming agent is recommended when the coating is being applied to post harvest produce commercially. Preparation and application of the coating without an antifoaming agent frequently result in foaming and a consequent delay in the time of usefulness due to the elapse of time before which the foam dissipates and the coating is ready to use. An antifoaming agent eliminates the delay and is employed primarily as a matter of production expediency. In the present invention about 0.001 to 0.5% of an antifoaming agent can be used such as polydimethylsiloxane, known as FG-10 available from the Dow Corning Corporation, Midland, Mich.

In the case of bananas and other fruits and vegetables having an initial preservation period between harvesting and initiation of the rimpening process and a second preservation period between initiation of the ripening process and the time of consumption, the coating process of the invention may be employed for purposes of preservation in either or both of the two periods.

The coating solution is appropriately prepared by mixing deionized water to a concentrated emulsion that contains approximately 50% solids by weight of polyvinylidene chloride copolymer to adjust to the appropriate concentration.

To that solution is added while mixing the appropriate concentration of surfactant, biocide, and antifoaming agent to achieve the required industrial behavior for application.

In one example of an experimental comparative test, substantially identical green and hard but previously ungassed bananas were purchased from a local distributor. Control bananas were coated by dipping the same for about 10 seconds into an emulsion containing about 5% by weight polyvinylidene chloride copolymer DIOFAN A036 containing Triton—X45 surfactant, followed by drying in ambient air. Other of the bananas were not treated in any manner. The bananas were then stored in a refrigerator at 58° F. for two days. Then the boxes of bananas were taken to a distributor and placed into an ethylene gassing room for two days at approximately 72° F. to accelerate yellowing or ripening and stored at ambient conditions for the remainder of the test. A reliable method to determine the effectiveness of the coating in delaying ripening is to observe the amount and size of brown spots or "sugar spots" that appear on the skin of the banana. After 4 days small brown spots appeared on the untreated bananas and became numerous and large on day 5. In contrast hardly any brown spots appeared on the coated bananas on the polymer-coated bananas after 6 days. And after 7 days a significant portion of the uncoated banana skin was brown spotted and less than 10% of the coated bananas had brown spots, which were very small in comparison. After 8 days the control bananas were mostly brown and soft to the touch whereas the coated bananas had small brown spots and the interior flesh was firm with no off flavors or odors when tasted. Under these particular conditions the coated product has at least a 2-3 day better shelf life than the uncoated controls.

In another comparative test, freshly harvested pineapples were procured from an organic food store. One of the biggest problems with freshly harvested pineapples is weight loss during storage and distribution. Four fresh pineapples that had no coating were used as controls and four pineapples and crowns of the fruit were coated with a 5% emulsion as in example 1. The fruit was held at room temperature for 7 days after coating and weight loss was measured. After 7 days the weight loss of the control cell averaged 10.7% and that of the coated product was 8.6% at 20% reduction in weight loss vs. the controls. To put that in perspective that would be an increase of 20,000 pounds of product sold in a 1,000,000-pound shipment. In addition the coated fruit was firmer to the touch and the internal flesh was not translucent and displayed no internal brown spots, which is indicative of loss of shelf life vs. the control that was translucent and had brown spots in one half of the samples.

Additional fruits and vegetables that are likely candidates for successful practice of the invention include, avocados, cantaloupes, honeydew melons, mangoes, papayas, platains, star fruit, lemons, limes, oranges, tangerines, kumquats, tangelos, grapefruits, lychee, guava, breadfruit, kiwi and rambutan.

As shown by the experimental tests, the coating process of the invention enhances control over respiratory exchange or gas in and particular water and water vapor transmission of the coated produce, and contributes significantly to prolong the shelf life of the post harvest produce. Also, the coating inhibits fungal mold growth and with appropriate additives inhibits bacterial growth on the surface of the produce.

The objects and advantages of the invention have therefore been shown to be attained in a convenient, economical, practical and facile manner.

While certain preferred embodiments of the invention have been herein described, it is to be appreciated that various changes, rearrangements, modifications, and additions may be made thereto without departing from the scope of the invention as defined by the appended claims.

What is claimed:

1. A process for preserving post harvest produce comprising the step of coating the post harvest produce with a coating composition comprising an aqueous emulsion of less than about 50% by weight of a polyvinylidene chloride copolymer, and from about 0.0005 to 10% by weight of a non-ionic surfactant, wherein said copolymer is formed exclusively of co-monomers selected from the group consisting of vinyl chloride, vinyl acetate, methyl methacrylate, propylene, ethylene, acrylates, styrenes, and combinations thereof, and wherein the post harvest produce are fruits and vegetables.

2. The process as set forth in claim 1, wherein the coating composition includes from about 0.05 to 0.1% by weight of an antimicrobial.

3. The process as set forth in claim 1, wherein the coating composition includes from about 50 to 1000 parts per billion of a fungicide.

4. The process as set forth in claim 1, wherein the coating composition includes about 0.0005 to 0.1% polydimethylsiloxane.

5. The process as set forth in claim 1, wherein said non-ionic surfactant is selected from the group consisting of octylphenol ethoxylates, nonylphenol ethoxylates and polysorbates.

6. The process of claim 1, wherein the fruits and vegetables are selected from the group consisting of bananas, pineapples, avocados, cantaloupes, honeydew melons, mangoes, papayas, platains, star fruit, lemons, limes, oranges, tangerines, kumquats, tangelos, grapefruits, lychee, guava, breadfruit, kiwi, rambutan, and a combinations thereof.

* * * * *